UNITED STATES PATENT OFFICE.

JOSEPH HAYWARD, OF CLEVELAND, OHIO.

IMPROVEMENT IN COMPOSITIONS FOR BLACKING LEATHER.

Specification forming part of Letters Patent No. 4,498, dated May 9, 1846.

*To all whom it may concern:*

Be it known that I, JOSEPH HAYWARD, of Cleveland, in the county of Cuyahoga and State of Ohio, have invented a new and useful Composition for Blacking the Flesh Side of Leather and Rendering the Color Durable; and I hereby declare that the following is a full, clear, and exact description of the principle or character thereof, which distinguishes it from all other things before known, and of the method of compounding and using the same.

Several kinds of blacking have heretofore been prepared, but they have either been too expensive, as the well-known oil-blacking, they are smutty when worked, or are not permanent when worn, and most of them are found, in time, to produce a crust or hard substance on the surface of the leather, which renders it unsalable and depreciates its value.

My improved composition blacking is made to obviate these various defects, and is found to produce a beautiful even surface, easily polished, and requiring much less labor in the finishing of the leather than any other now in use, while it retains all its good qualities after lying in store, the surface of the leather remaining as soft and pliable as when first finished.

The proportions and manner of combining for one gallon of my blacking the various ingredients are as follows: Dissolve one pound of pure potash in two quarts of soft water, then add to it one pound of tallow and boil them together one hour. Then dissolve a quarter of a pound of potash in a quart of soft water and stir into it two-fifths of a pound of pure lamp-black until it is dissolved or well mixed, and add this decoction to the one first above named and boil them together fifteen minutes, after which add one quart of "bank" or "straits" oil and stir it well into the mixture and let it cool. It is then fit for use.

To apply the above composition, prepare the leather in the usual way and apply the blacking with a brush. The leather is then finished by the same process as is required when the oil-blacking is used.

Having thus fully described my improved blacking, I wish it to be understood that I do not claim as my improvement the employment of soap in the manufacture of blacking, as that has already been done; nor combining therewith lamp-black; but

What I do claim as my invention, and desire to secure by Letters Patent, is—

The combination of lamp-black with an alkali, as above set forth, before combining therewith the compound of potash, tallow, and oil, in the manner and for the purpose set forth, by which a smooth and durable blacking is produced.

JOSEPH HAYWARD.

Witnesses:
   J. J. GREENOUGH,
   A. P. BROWNE.